(12) United States Patent
Kalarikal Janardhana et al.

(10) Patent No.: US 9,569,490 B1
(45) Date of Patent: *Feb. 14, 2017

(54) MIN/MAX QUERY WITH SYNOPSIS GUIDED SCAN ORDER

(71) Applicant: International Business Machines Corporation, Armonk, NY (US)

(72) Inventors: Madhusudan Kalarikal Janardhana, Bangalore (IN); Andanagouda F. Patil, Bangalore (IN); Steven R. Pearson, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,532

(22) Filed: Apr. 18, 2016

Related U.S. Application Data

(63) Continuation of application No. 15/007,706, filed on Jan. 27, 2016.

(51) Int. Cl.
*G06F 17/30* (2006.01)

(52) U.S. Cl.
CPC ... *G06F 17/30454* (2013.01); *G06F 17/30339* (2013.01); *G06F 17/30864* (2013.01)

(58) Field of Classification Search
CPC .............. G06F 17/30864; G06F 17/30067; G06F 17/30867

(Continued)

(56) References Cited

U.S. PATENT DOCUMENTS 6,973,452 B2    12/2005   Metzger et al.
8,996,544 B2 *   3/2015   Ziauddin ........... G06F 17/30492
                                                     707/756

(Continued)

FOREIGN PATENT DOCUMENTS

WO     2015128756 A1    9/2015

OTHER PUBLICATIONS

Catterall, Robert, "Using DB2 for z/OS Real-Time Statistics for Smarter Database Management", Catterall Consulting, Jun. 29, 2010, <http://catterallconsulting.blogspot.ca/2010/06/using-db2-for-zos-real-time-statistics.html>, 4 pages.

(Continued)

*Primary Examiner* — Rehana Perveen
*Assistant Examiner* — Loc Tran
(74) *Attorney, Agent, or Firm* — Gilbert Harmon, Jr.

(57) ABSTRACT

An approach for synopsis guided scan processing of MIN/MAX data queries where a minimal or maximal data query operation and a synopsis store are received. The synopsis store includes at least one of tuple range identifiers, column minimal and maximal metadata values. The synopsis store is sorted, where the column minimal or maximal metadata values search order is created for the tuple range identifiers. Dataset data associated with the tuple range identifiers is searched in the search order for a minimal or maximal value result until the minimal value result is less than or equal to a next column minimal metadata values or the maximal value result is greater than or equal to a next column maximal metadata values respectively and the minimal or maximal value result associated with the respective minimal or maximal data query operation is output.

1 Claim, 4 Drawing Sheets

(58) Field of Classification Search
USPC .................................. 707/765, 769, 781
See application file for complete search history.

(56) References Cited

U.S. PATENT DOCUMENTS

2015/0199407 A1* 7/2015 Ziauddin ........... G06F 17/30492
  707/756
2015/0286682 A1* 10/2015 Ziauddin ........... G06F 17/30486
  707/718

OTHER PUBLICATIONS

Eaton, Chris, "How Data Skipping Works, 3-Part series", IBM DB2 with BLU Acceleration, <http://www.ibmbluhub.com/how-data-skipping-works/>, printed Nov. 5, 2015, 3 pages.
Klopp, Rob, "Netezza Zone Maps and I/O Avoidance", Database Fog Blog, Apr. 25, 2014, <http://skylandtech.net/2014/04/25/netezza-zone-maps-and-io-avoidance/>, 7 pages.
Mullins, Craig, S., "Using Real Time Statistics (RTS)", DB2 Update, DB2 Developer's Guide (5th edition), Jun. 2004, <http://www.craigsmullins.com/dbu_0604.htm>, 9 pages.
Raman et al., "DB2 with Blu Acceleration: So Much More than Just a Column Store", The 39th International Conference on Very Large Data Bases, Aug. 26-30, 2013, Riva del Garda, Trento, Italy. Proceedings of the VLDB Endowment, vol. 6, No. 11, Copyright 2013, pp. 1080-1091.
Smith, Bryan, F., "IBM DB2 RUNSTATS Utility and Real-time Statistics", IBM Information on Demand 2007, Oct. 14-19, 2007, Mandalay Bay Las Vegas, Nevada, pp. 1-67.
"Database query execution time optimization with limiting number of low-level statistics comparisons", An IP.com Prior Art Database Technical Disclosure, IP.com No. 000240483, IP.com Electronic Publication: Feb. 3, 2015, 6 pages.
"How MySQL Uses Indexes", MySQL 5.0 Reference Manual, 8.3.1, © 2015 Oracle Corporation and/or its affiliates, <https://dev.mysql.com/doc/refman/5.0/en/mysql-indexes.html>, printed Nov. 5, 2015, 2 pages.
"Indexes for fast access", IBM Knowledge Center, <ww-01.ibm.com/support/knowledgecenter/SSCRW7_6.3.0/com.ibm.redbrick.doc6.3/perf/perf25.htm?cp=SSCRW7_6.3.0%2F0-1-3-3-1>, printed on Nov. 5, 2015, 1 page.
"Retrieval using standard aggregate functions", Cassandra 2.2, © 2015 DataStax, Inc., last updated: Oct. 30, 2015, <http://docs.datastax.com/en/cql/3.3/cql/cql_using/useQueryStdAggregate.html>, 1 page.
"The MIN( ) and MAX( ) Optimizations", Apache Derby, last published Jan. 24, 2013, Coypright © 2004-2006 Apache Software Foundation, <http://db.apache.org/derby/docs/10.0/manuals/tuning/perf51.html>, 1 page.
"The SQLite Query Planner", The SQLite Query Optimizer Overview, <https://www.sqlite.org/optoverview.html>, printed Nov. 5, 2015, 11 pages.
"Understanding Netezza Zone Maps", IBM PureData—Netezza Developer Network (NDN), IBM Bluemix, May 22, 2014, <https://www.ibm.com/developerworks/community/blogs/Wce085e09749a_4650_a064_bb3f3b738fa3/entry/understanding_netezza_zone_maps?lang=en>, 3 pages.
Kalarikal Janardhana, Madhusudan et al., "MIN/MAX Query With Synopsis Guided Scan Order", U.S. Appl. No. 15/007,706, filed Jan. 27, 2016, 34 pages.
IBM Appendix P, patents or patent applications treated as related, Jul. 25, 2016, 2 pages.

* cited by examiner

MIN/MAX QUERY WITH SYNOPSIS GUIDED SCAN ORDER

BACKGROUND OF THE INVENTION

The present invention relates generally to database query evaluation of minimal column value (MIN(column)) and/or maximal column value (MAX(column)) operations, collectively "MIN/MAX" operations, and more particularly to reducing computational workload for the MIN/MAX operations by utilizing information in database synopsis tables and governing conditional exit from dataset scans.

Searching for information using a query of a database table (i.e., dataset) can perform a full, unsorted data scan or search a sorted column index for results. Information stored in large database systems such as, but not limited to, data warehouses and analytic data stores often do not maintain indexes due to heavy computational costs and/or storage consumption. Data warehouses, analytics and other non-indexed database systems may use metadata structures to help reduce the amount of data scanned by query operations. A class of metadata structures known by one skilled in the art as synopsis tables and/or zone maps are internal tables in some database systems and are automatically populated when one or more tuple data (e.g., data rows) are initially inserted into a database table. Synopsis data is metadata comprising information such as, but not limited to, summary information about data residing in underlying datasets, highest and lowest column values and tuple ranges that identify a region of storage in a database system for a range of dataset rows in each respective synopsis row. When a query references columns summarized in a synopsis table, the synopsis information can be used to bypass some tuple ranges of the dataset that do not qualify for the query result based on applicable query predicates (e.g., modifier, expression), but the query will still require reading of the tuple ranges of the dataset that cannot be eliminated from consideration based on the synopsis metadata, and in general that may represent a large portion of the underlying data values. In the case of MIN/MAX queries where the target column of a MIN/MAX query appears in the synopsis metadata, a scan of only the synopsis metadata cannot be used to answer the query since tuple data values can be changed or deleted over time and, unlike in a standard database index, the synopsis metadata is not dynamically maintained. To find the actual extreme value, a typical MIN/MAX query reads the underlying data from either the entire dataset (if no predicates can be applied via the synopsis metadata) or from each tuple range of the dataset that cannot be eliminated by applying query predicates to the synopsis metadata. Thus, the query scan may traverse an entire set of synopses and access a majority of the associated underlying tuple ranges before outputting a final result which can cause computational costs to vary greatly.

SUMMARY

As disclosed herein, a method for synopsis guided scan processing of MIN/MAX data queries, the method comprising: receiving one of a minimal data query operation and a maximal data query operation; receiving a synopsis store wherein the synopsis store comprises at least one of one or more tuple range identifiers, one or more column minimal metadata values and one or more column maximal metadata values; sorting the synopsis store, creating a search order of the one or more tuple range identifiers based on at least one of the one or more column minimal metadata values and the one or more column maximal metadata values wherein the search order comprises sorting the one or more column minimal metadata values in ascending order and the one or more column maximal metadata values in descending order; filtering the search order creating a filtered search order comprising a predetermined quantity of the one or more tuple range identifiers wherein the predetermined quantity is based on at least one of a static value, calculated value, metadata statistics and dataset data statistics; searching dataset data associated with the one or more tuple range identifiers in the search order for at least one of a minimal value result and a maximal value result until at least one of the minimal value result is less than or equal to a next one or more column minimal metadata values and the maximal value result is greater than or equal to a next one or more column maximal metadata values respectively; responsive to further search, when the at least one of the minimal value result and the maximal value result is not found, the dataset data associated with the one or more tuple range identifiers in the filtered search order until at least one of the minimal value result and the maximal value result match at least one of the one or more column minimal metadata values and the one or more column maximal metadata values; searching the dataset data further comprising executing an unordered search when at least one of the minimal value result and the maximal value result is not found in the filtered search order wherein the unordered search searches a reduction of the synopsis store based on a subtraction of the one or more tuple range identifiers in the filtered search order from the synopsis store using a local predicate and outputting at least one of the minimal value result and the maximal value result associated with one of the minimal data query operation and the maximal data query operation respectively.

DETAILED DESCRIPTION

Figure 1:
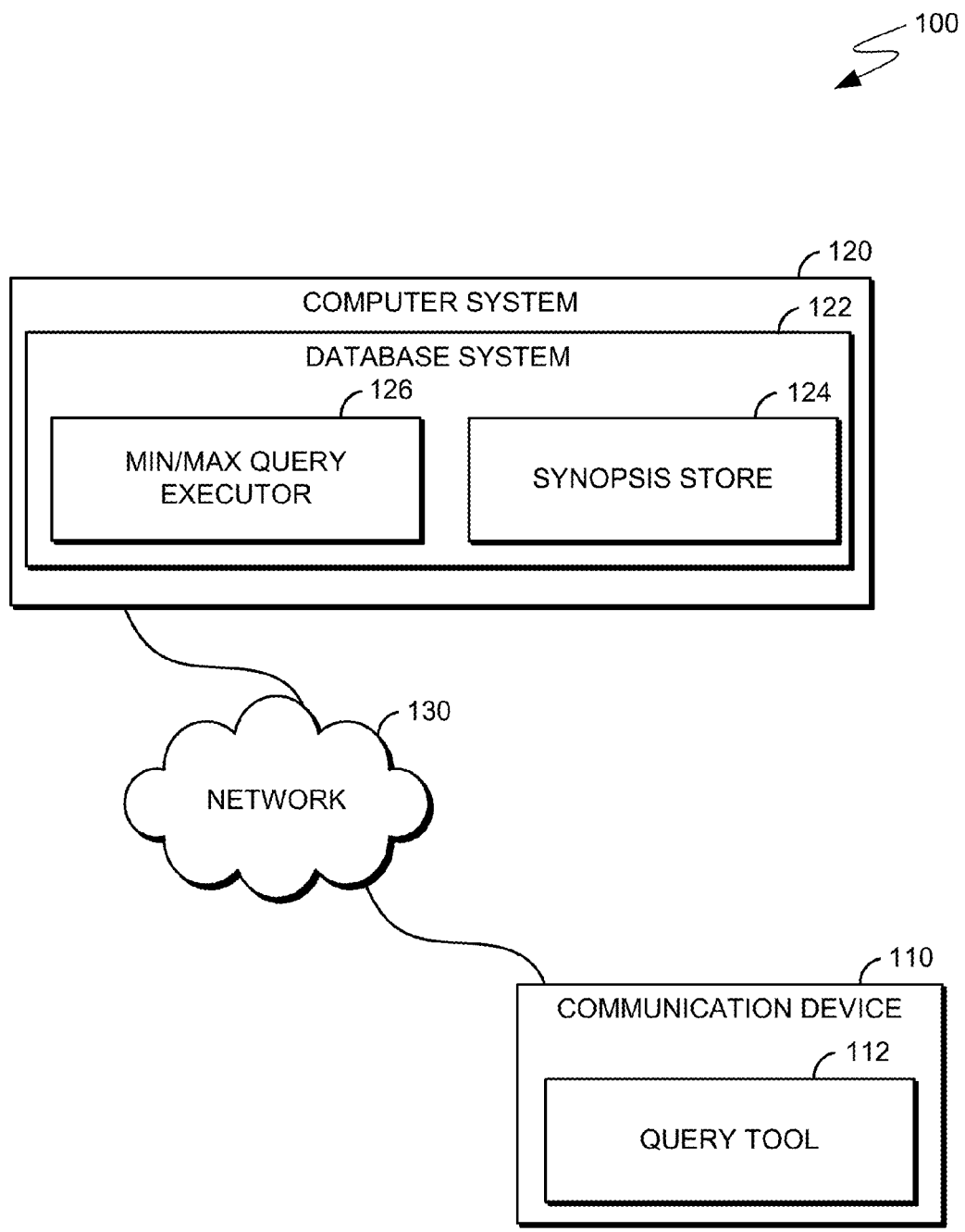
FIG. 1 is a functional block diagram illustrating a computing environment, in accordance with an embodiment of the present invention.

Embodiments of the present invention provide systems, methods and computer program products for reducing computational workload to fetch maximal (MAX) and/or minimal (MIN) data values using synopsis guided scanning and sorting a portion of a synopsis store. Synopsis guided MIN/MAX searches use search exit rules when a MIN/MAX value is found to minimize table read operations and if a MIN/MAX value is not found in the underlying portion of the dataset associated with a portion of a synopsis store then embodiments of the present invention provide for an unordered search of remaining tuple ranges of the dataset. It should be noted that the term synopsis is used to characterize particular types of metadata that are known by one skilled in the art by other terms such as, but not limited to, zone map and strata map. An example synopsis information comprises a MIN metadata value that represents the most minimal data value of a dataset column found in a range of dataset tuples (i.e., tuple range) and a MAX metadata value represents the most maximal data value of a dataset column in a tuple range. For very large databases, synopsis tables can be significantly smaller than actual datasets and the use of synopsis to scan particular data in tuples within a database system storage region (e.g., page, extent). Embodiments of the present invention can be shown to reduce computational load of data retrieval by leveraging the synopses and using search exit rules. It should be noted that synopses and/or zone maps can include a range of storage subsets such as, but not limited to, physical page(s), extent(s) and logical tuple range(s). Embodiments of the present invention represent one synopsis metadata tuple to be a portion of a source dataset. It should also be noted that commercial and custom database products can use other equivalent terminology for synopsis and tuple range and are understood to fall within embodiments of the present invention.

In addition to using synopsis metadata search exit rules to skip tuple ranges, embodiments of the present invention can use a portion (e.g., filter) of sorted synopsis tuples to minimize the amount of data scanned. The portion of synopsis tuples is a predetermined quantity used as a basis to create an ordered filtered synopsis list. Predetermination of the synopsis portion size can be established by techniques such as, but not limited to, using a static value, using a calculated value based on a percentage of size of synopsis table, using metadata statistical measures and dataset data statistics based on data change activity.

Once an ordered filtered synopsis list is created, a subsequent MIN/MAX dataset data value search is executed using tuple ranges in the sequence of the ordered filtered synopsis list. When a MIN/MAX value is found, search termination rules are applied to abandon further computation. If the MIN/MAX value is not found in the portions of the source table existing in the ordered filtered synopsis list then embodiments of the present invention can proceed with an unordered search using the remainder of the original synopsis table and/or the underlying source table.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 1 is a functional block diagram of computing environment 100, in accordance with an embodiment of the present invention. Computing environment 100 comprises communication device 110, and computer system 120, interconnected via network 130. Communication device 110 and computer system 120 can be desktop computers, laptop computers, specialized computer servers, or the like. In certain embodiments, communication device 110 and computer system 120 represent computer systems utilizing clustered computers and components acting as a single pool of seamless resources via network 130. For example, such embodiments can be used in data center, cloud computing, storage area network (SAN), and network attached storage (NAS) applications. In general, communication device 110 and computer system 120 are representative of any electronic devices, or combination of electronic devices, capable of executing computer readable program instructions, as described in detail with regard to FIG. 4.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between communication device 110 and computer system 120, in accordance with an embodiment of the present invention.

In one embodiment of the present invention, computer system 120 comprises database system 122, which further comprises synopsis store 124 and MIN/MAX query executor 126. Database system 122 comprises any combination of commercial or custom software products (not shown) associated with operating and maintaining a database system 122 environment. It should be noted that database system 122 can comprise a combination of row-organized and column-organized datasets and embodiments of the present invention are described in row-organized terminology for simplicity.

In one embodiment of the present invention synopsis store 124 comprises metadata such as, but not limited to, database tuple ranges, page identifier of each tuple range and data column minimal and maximal values for table columns within each tuple range when synopsis entries are created. Synopsis store 124 can be a plurality of synopsis stores 124 and is managed as a central metadata data store by database system 122.

In one embodiment of the present invention MIN/MAX query executor 126 is integrated with database system 122. Other embodiments of the present invention MIN/MAX query executor 126 can be separate from database system 122 and can be dependent on implementation requirements. Further, MIN/MAX query executor 126 can be a plurality of MIN/MAX query executors 126 within database system 122. MIN/MAX query executor 126 can receive, for example, MIN(column) and MAX(column) query operations and references synopsis store 124 to search for respective minimal and maximal values in database system 122 datasets. When MIN/MAX query executor 126 completes a MIN/MAX search, a resulting value can be sent toward the originating query request of database system 122 and/or query tool 112.

In one embodiment of the present invention, communication device 110 comprises query tool 112. Query tool 112 can be a plurality of query tools 112 used to retrieve and manage data within database system 122 and comprise any combination of commercial or custom software products (not shown) associated with data retrieval and maintenance of database system 122.

Figure 2:
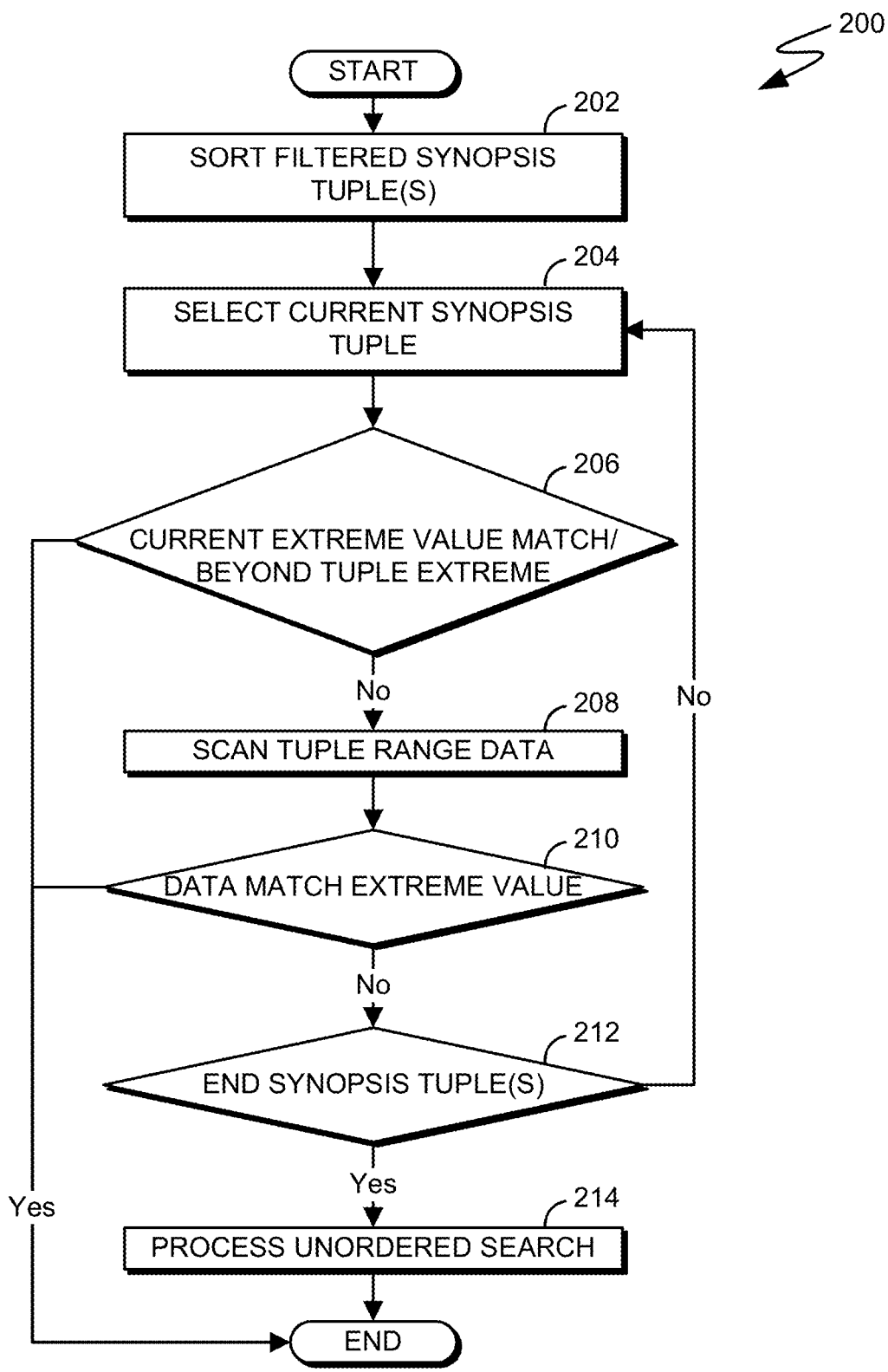
FIG. 2 is a flowchart depicting synopsis guided scan processing of MIN/MAX data queries, in accordance with an embodiment of the present invention.

FIG. 2 is a flowchart depicting synopsis guided scan processing of MIN/MAX queries, in accordance with an embodiment of the present invention. MIN/MAX query executor flow diagram 200, is an example flow chart of a series of operations executed within database system 122. It is understood that the techniques provided herein can encompass alternate sequencing of one or more of the operations shown in FIG. 2. For example, different sequencing of operations may occur to achieve the same result and are encompassed by embodiments of the present invention herein.

Step 202 SORT FILTERED SYNOPSIS TUPLE(S) receives one of a MIN and MAX query with a specified table column to be searched (e.g., SELECT MAX(a) FROM table_n). Synopsis store 124 is scanned in reverse sequence (e.g., the last synopsis row toward the first synopsis row) to favor recently written synopsis regions in a sort operation. Scanning the synopsis in reverse, increases the probability that the value extremes of data tuples, in an underlying dataset, reflect the metadata MIN/MAX values. Conversely, older tuple ranges have a higher probability of suffering substantial deletions of data tuples and thereby are less likely to reflect metadata MIN/MAX values. A predetermined portion of the sorted synopsis and corresponding tuple ranges are selected to build/create an ordered filtered synopsis list. The ordered filtered synopsis list comprises tuple ranges that most likely have MIN/MAX tuple data values for a column of interest. It should be noted that the sort order used to create the ordered filtered synopsis list for a MIN(column) operation is ascending whereas a MAX (column) operation is descending.

Step 204 SELECT CURRENT SYNOPSIS TUPLE begins a processing loop where each synopsis tuple is selected in sequence of the ordered filtered synopsis list until the last tuple range in the ordered filtered synopsis list is processed or an early loop exit is made.

Step 206 CURRENT EXTREME VALUE MATCH/BEYOND TUPLE EXTREME is a comparison of an extreme value retrieved from a data tuple during a tuple range search. The current extreme value, which is maintained as underlying table rows are examined, is compared to the MIN/MAX metadata value of the newly selected synopsis tuple. If the current extreme value matches or is beyond (i.e., greater than for MAX, less than for MIN) the search column metadata MAX/MIN value then the MAX/MIN result has been found and searching further synopsis tuples will yield no values beyond the current extreme value. For example, if the current extreme value in case of a MIN(column) operation is less than or equal to the MIN(column) metadata value of the current synopsis tuple then the search can end as the ordered filtered synopsis list is in ascending order for a MIN(column) and all subsequent tuple ranges will comprise tuple data greater than or equal to the current extreme value. If the comparison in step 206 CURRENT EXTREME VALUE MATCH/BEYOND TUPLE EXTREME does not match or is not beyond the current extreme value then processing proceeds to step 208 SCAN TUPLE RANGE DATA.

Step 208 SCAN TUPLE RANGE DATA searches the current source table tuple range to find values of the MIN/MAX column. It should be noted that the tuple data values within the tuple range do not need to be ordered, partially ordered or bucketed with respect to the search operation. Embodiments of the present invention can select a MAX/MIN extreme value tuple data or send a range of tuple data values within the tuple range toward step 210 DATA MATCH EXTREME VALUE for processing.

Step 210 DATA MATCH EXTREME VALUE compares the tuple data value(s) retrieved in step 208 SCAN TUPLE RANGE DATA to the current metadata respective MIN (column)/MAX(column) value. If the data value matches the respective metadata MIN(column)/MAX(column) value then the search can end as the MIN/MAX value has been found. For example, if a minimum tuple data range value is 10 and the corresponding metadata MIN value is 10 then the search is satisfied and further processing of the ordered filtered synopsis list will yield no better search results. The data value can be assigned as the current extreme value and the search loop is exited. If the tuple data value did not match the respective metadata MIN(column)/MAX(column) and the tuple data value is beyond the current extreme value, the tuple data value replaces the current extreme value otherwise the current extreme value remains unchanged and processing continues. It should be noted that some embodiments of the present invention can skip the comparison portion of step 210 DATA MATCH EXTREME VALUE based on computational costs of comparing the current extreme value with each current tuple range metadata can effectively double the number of comparisons for each current extreme value. The benefit of exiting a search early is a trade-off to consider with factors such as, but not limited to, ordered filtered synopsis list size, page size, potential page input/output (I/O), decompression, and decryption that can affect data processing costs.

In step 212 END SYNOPSIS TUPLE(S), the ordered filtered synopsis list is determined to have no further tuple ranges to process and no exit condition was activated. In this case, the MIN/MAX search proceeds with an unordered search. Embodiments of the present invention can reduce the MIN/MAX search locally to avoid a second scan of tuple ranges already processed. One embodiment of the present invention provides a local predicate such as, but not limited to, a where clause comprising the MIN/MAX column and the current extreme value (e.g., WHERE A<10). For the example, an unordered search will skip tuple ranges where synopsis metadata is beyond the "where" clause predicate (e.g., MIN(a) is 9 or less).

Step 214 PROCESS UNORDERED SEARCH performs an unordered search and/or a tuple range reduced search based on, but not limited to, the local predicate sent from step 212 END SYNOPSIS TUPLE(S) and tuple range subtraction of the ordered filtered synopsis list from synopsis store 124. The unordered search returns the MIN/MAX result toward the originating requestor.

It should be noted that embodiments of the present invention are optimized for unfiltered MIN/MAX query operations and/or for MIN/MAX query operations with predicates that can also be applied to a synopsis table scan, such as, but not limited to, a single column open-ended predicate. For example, open-ended predicates such as, but not limited to, "A>constant" (for MAX(A)) and "A<constant" (for MIN(A)) allows for a search for an extreme value beyond the predicate boundary.

It should be further noted that, embodiments of the present invention have applicability to certain "Top N" queries. A "TOP N" query involves ordering data by a particular column (e.g., select <something> from T1 [where <predicate>] order by A [asc I desc] fetch first <N> rows only). A relatively small value of "N" is similar in nature to a MIN/MAX query of a column. Applying embodiments of the present invention would utilize modified exit rules to evaluate all members of the current set of tuple ranges rather than a single value. The number of tuple ranges in the ordered filtered synopsis list could be greater than "N" of the "TOP N" query. Applying embodiments of the present invention to a "TOP N" query operation can avoid a more extensive sort operation as compared to standard "TOP N" query operations.

Figure 3A:
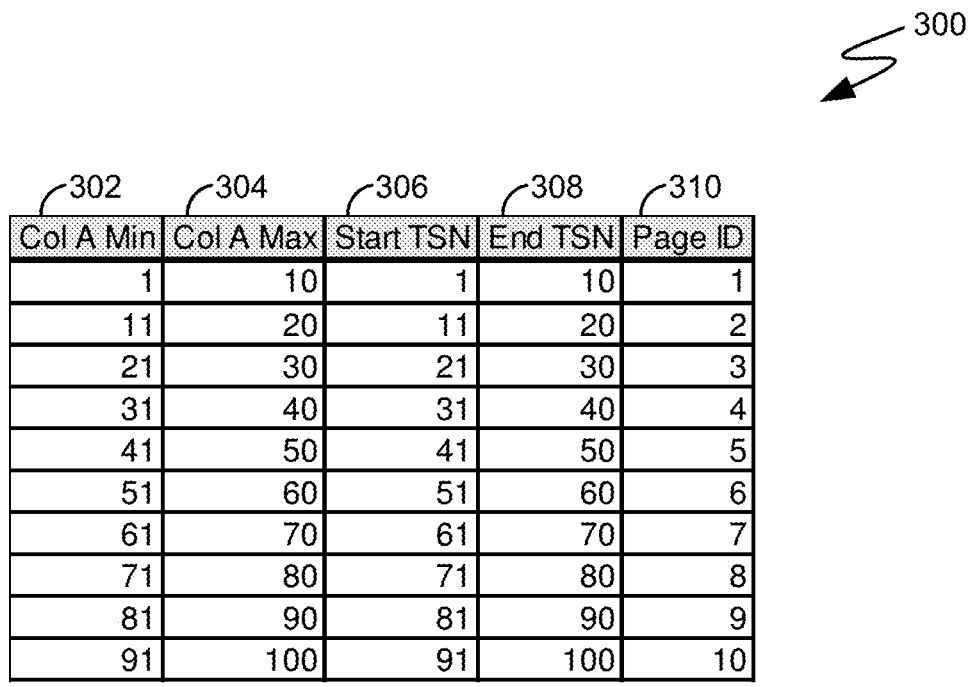
FIG. 3A, B depicts synopsis store sample tables with metadata values, in accordance with an embodiment of the present invention.

FIG. 3A depicts a synopsis store sample table with ordered metadata values, in accordance with an embodiment of the present invention. The synopsis store sample 300 represents one aspect of ordered data that can comprise synopsis store 124 and further comprises heading 302 Col A Min, heading 304 Col A Max, heading 306 Start TSN, heading 308 End TSN and heading 310 Page ID.

Heading 302 Col A Min is a metadata minimal value of column A, where column A is an example column identifier of a dataset in a database system 122. Each row comprises the minimal data value that existed when a tuple range was created in the synopsis store 124. Likewise heading 304 Col A Max is a metadata maximal value of column A, where each row comprises the maximal data value that existed when a tuple range was created.

Heading 306 Start Tuple Sequence Number (TSN) is a tuple range logical identifier of a starting location of table rows (i.e., tuples) comprising column A data. Likewise heading 308 End TSN is a tuple range logical identifier representing the ending location of tuples comprising column A data.

Heading 310 Page ID is an identifier of a tuple range. In synopsis store sample 300, a page is a referential term of tuple range storage allocation, for simplicity of illustration. In this description, each range of TSNs as recorded by a tuple range, comprise a single page of table data.

Referencing synopsis store sample 300, the values of heading 302 Col A Min and heading 304 Col A Max happen to occur in ascending order. Given a MAX(A) query (e.g., SELECT MAX(a) FROM table_n), synopsis store sample 300 and using embodiments of the present invention, synopsis store sample 300 is scanned in descending order. An ordered filtered synopsis list is created, comprising a predetermined quantity of tuple ranges. For example, given a predetermined filter quantity of five, five tuple ranges are selected in descending order of Heading 304 Col A Max. Starting in reverse order, the ordered filtered synopsis list will comprise pages 10, 9, 8, 7 and 6. Source table tuple ranges identified as page 10 are read in accordance of the sequence of the ordered filtered synopsis list. In this case, it can be expected that the MAX value will be found in the first page of the source table that is read, assuming the underlying table (e.g., table_n) comprising column A data has not suffered substantial deletions. In this example, the highest column A tuple data value of the tuples found in page 10 is at least as large as the MAX metadata value (e.g., heading 304 Col A Max) of the next tuple range (page 9). Alternatively, if the highest tuple data value (i.e., current extreme value) in page 10 was equal to the MAX metadata value (e.g., heading 304 Col A Max) the MAX(A) result would be realized. In this example, the MAX(A) result is found after reading two pages (e.g., the synopsis page and page 10 of the source data table), assuming the synopsis metadata resides on a single page.

Figure 3B:
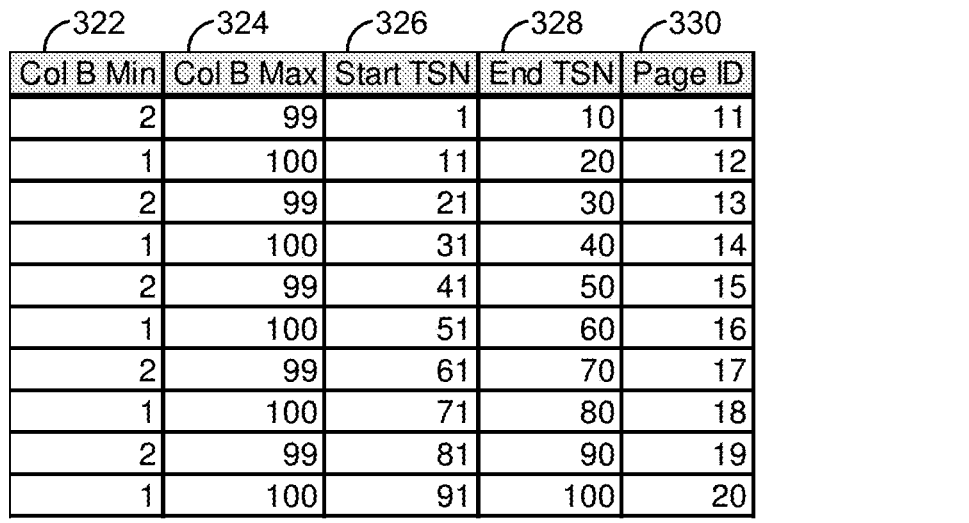

FIG. 3B depicts a synopsis store sample table with unordered metadata values, in accordance with an embodiment of the present invention. The synopsis store sample 320 represents one aspect of unordered data that can comprise synopsis store 124 and further comprises heading 322 Col B Min, heading 324 Col B Max, heading 326 Start TSN, heading 328 End TSN and heading 330 Page ID.

Heading 322 Col B Min is a metadata minimal value of column B where column B is an example column identifier of a dataset in a database system 122. Each row comprises the minimal data value that existed when a tuple range was created in the synopsis store 124. Likewise heading 324 Col B Max is a metadata maximal value of column B where each row comprises the maximal data value that existed when a tuple range was created.

Heading 326 Start TSN is a tuple range logical identifier representing the starting location of tuples comprising column B data. Likewise heading 328 End TSN is a tuple range logical identifier representing the ending location of tuples comprising column B data.

Heading 330 Page ID is an identifier of a tuple range similar to heading 310 Page ID.

With reference to synopsis store sample 320 the values of heading 322 Col B Min and heading 324 Col B Max are repeated and distributed within the synopses. Given a MAX (B) query (e.g., SELECT MAX(b) FROM table_n), synopsis store sample 320 and using embodiments of the present invention, synopsis store sample 320 is scanned in descending order. An ordered filtered synopsis list is created, comprising a predetermined quantity of tuple ranges. For example, given a predetermined filter quantity of five, five tuple ranges are selected in descending order of Heading 304 Col A Max. Starting in reverse order, a sorted synopsis list comprises pages 20, 18, 16, 14, 12, 19, 17, 15, 13 and 11 whereas the ordered filtered synopsis list comprises pages 20, 18, 16, 14 and 12. Source table tuple ranges are read starting with page 20 in accordance of the sequence of the ordered filtered synopsis list. In many cases, it can be expected that the MAX value will be found in the first page of the source table that is read, assuming that the underlying table (e.g., table_n) comprising column B data has not suffered substantial deletions. In this example, assume page 20 maximal value is 98, thus the current extreme value is set to 98. The search continues to page 18 and assume again that the maximal value found is 99. The processing loop replaces the current extreme value with 99 since the maximal data value from the current tuple range is greater the existing the current extreme value. The search continues to page 16 and assuming a value of 100 is found, processing is ended. In this case, the highest column B value of the tuples range found in page 16 is at least as large as the MAX metadata value (e.g., heading 324 Col B Max) of the next tuple range (page 14). As the MAX value was found in page 16, then the MAX query result was realized after reading 4 pages (e.g., synopsis page, plus pages 20, 18 and 16 of the source table). It should be noted that the above result realization assumes the synopsis metadata resides on a single page. As demonstrated in the above example, a MIN/MAX query operation can be performed with significantly reduced computational workload using embodiments of the present invention and considering large synopsis tables can comprise thousands of tuple ranges.

Figure 4:
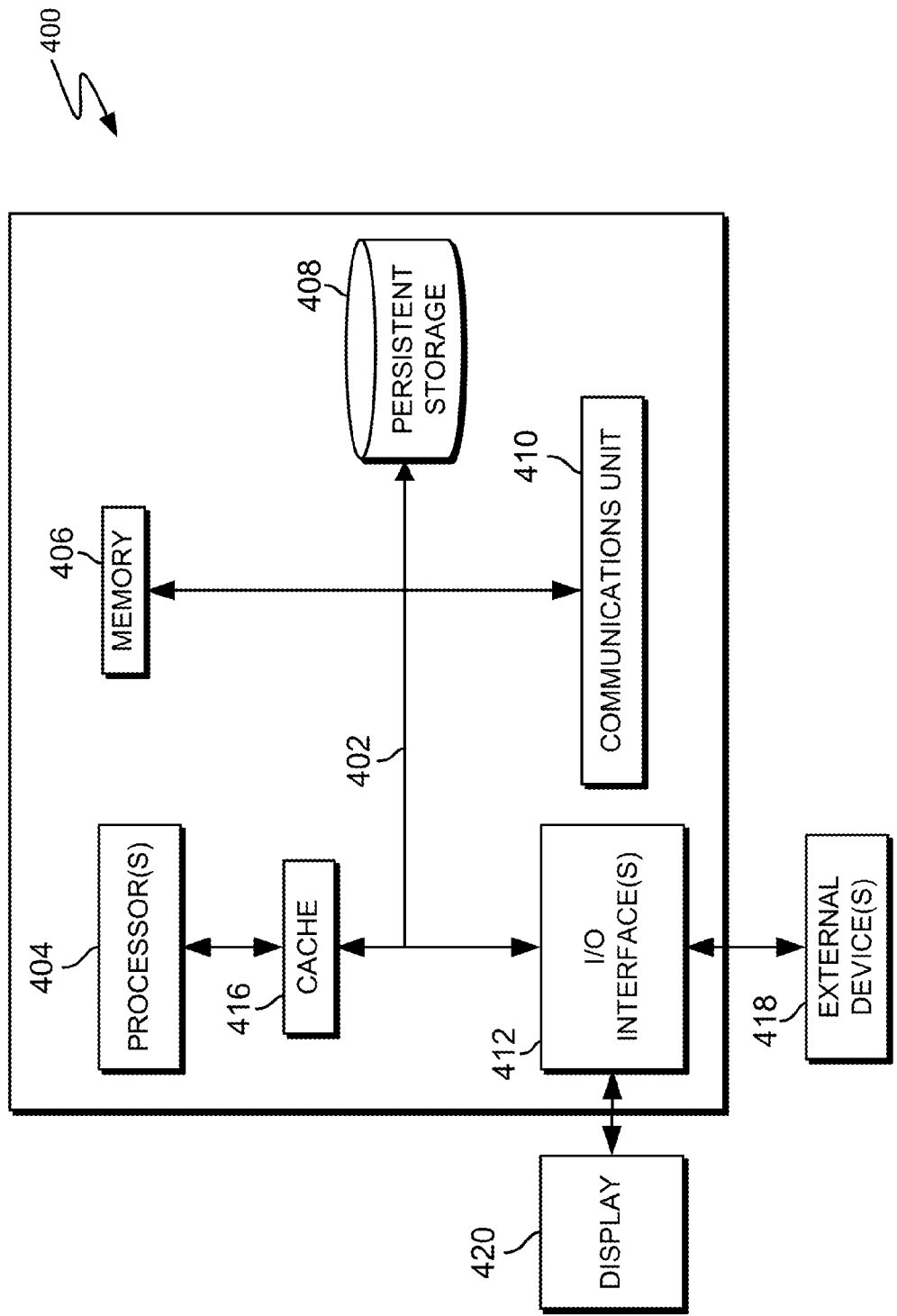
FIG. 4 depicts a block diagram of components of the server and/or the computing device, in accordance with an embodiment of the present invention.

FIG. 4 depicts a block diagram of components of communication device 110 and computer system 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for synopsis guided scan processing of MIN/MAX dataset data value queries, the method comprising:
   receiving, by MIN/MAX query executor, a minimal data query operation or a maximal data query operation to determine at least one of a minimal value result or a maximal value result, respectively;
   receiving, by the MIN/MAX query executor, a synopsis store wherein the synopsis store comprises one or more tuple range identifiers and at least one of one or more column minimal metadata values or one or more column maximal metadata values wherein each of the one or more tuple range identifiers is associated with a related dataset column;
   sorting, by the MIN/MAX query executor, the synopsis store, creating a search order of the one or more tuple range identifiers based on at least one of the one or more column minimal metadata values or the one or more column maximal metadata values wherein the search order comprises sorting the one or more column minimal metadata values in ascending order and the one or more column maximal metadata values in descending order;
   filtering the search order, by the MIN/MAX query executor, creating an ordered filtered synopsis list comprising a predetermined quantity of the one or more tuple range identifiers wherein the predetermined quantity is based on at least one of a static value, calculated value, metadata statistics or dataset data statistics;
   searching, by the MIN/MAX query executor, dataset data values of the related dataset column associated with the one or more tuple range identifiers in the ordered filtered synopsis list for at least one of the minimal value result or the maximal value result until at least one of reaching an end of the ordered filtered synopsis list, the minimal value result is less than or equal to a next column minimal metadata value or the maximal value result is greater than or equal to a next column maximal metadata value respectively;
   responsive to reaching the end of the ordered filtered synopsis list, searching, by the MIN/MAX query executor, the dataset data values of the related dataset column further based on executing an unordered search wherein the unordered search searches a reduction of the synopsis store based on a subtraction of the one or more tuple range identifiers in the ordered filtered synopsis list from the synopsis store using a local predicate; and
   outputting, by MIN/MAX query executor, at least one of the minimal value result or the maximal value result of the related dataset column associated with one of the minimal data query operation and the maximal data query operation respectively.

* * * * *